United States Patent Office 2,873,799
Patented Feb. 17, 1959

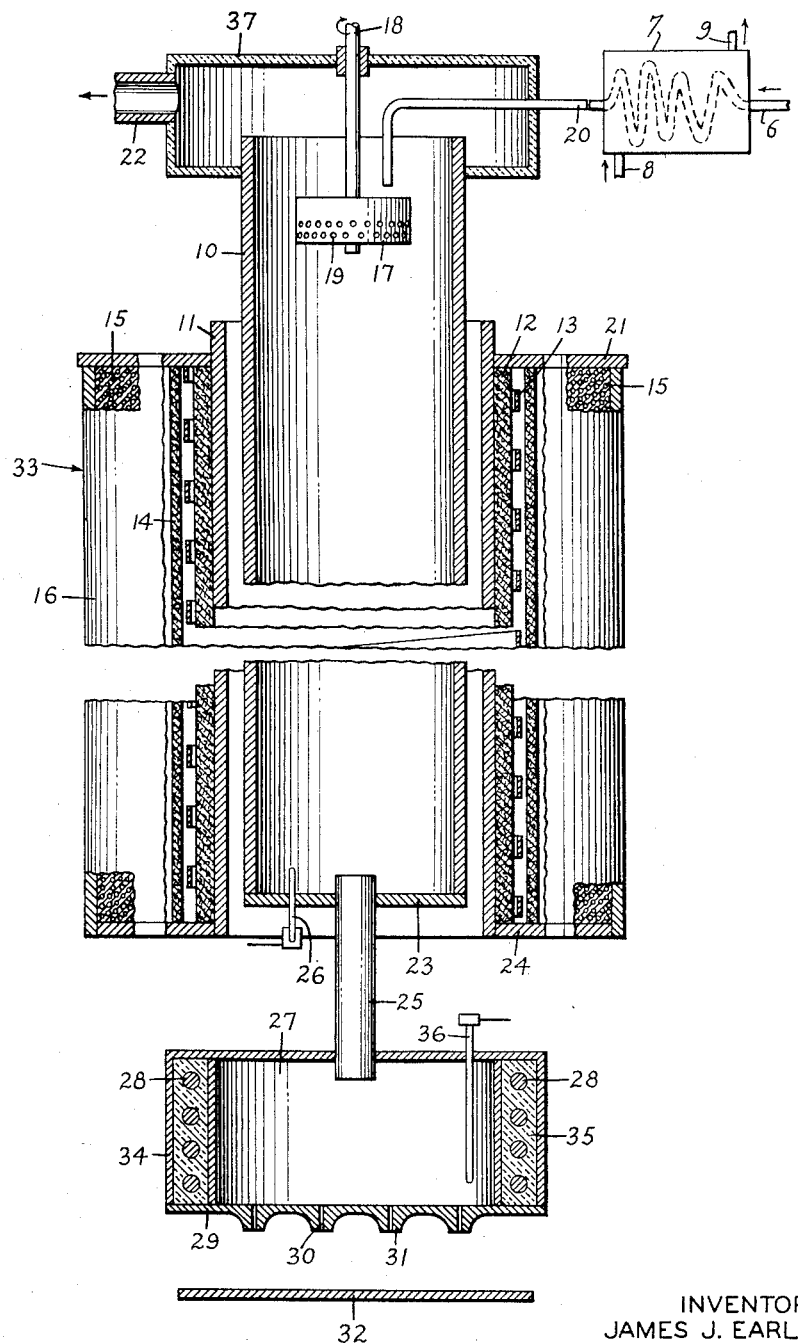

2,873,799

METHOD AND APPARATUS FOR DEHYDRATING AQUEOUS CAUSTIC SOLUTIONS

James J. Earley, Springfield, Pa., and Carl J. Franz, Mendam, N. J., assignors to Allied Chemical Corporation, a corporation of New York Application January 9, 1956, Serial No. 557,935

2 Claims. (Cl. 159—49)

This invention relates to a method and apparatus for dehydrating aqueous caustic solutions. More particularly, it relates to a method and apparatus whereby aqueous solutions of caustic soda may be evaporated to produce concentrated or even substantially anhydrous molten material which may then be solidified in pellet form. While reference will be made herein to caustic solutions or to product caustic, it will be understood that the process and apparatus is applicable to caustic potash as well as to caustic soda.

Heretofore, anhydrous caustic soda has been prepared from more or less dilute caustic liquors by evaporation in a pot still. As the solution is heated over an extended period of time, typically as long as several days or more, the temperature of the vessel is raised. During this extended period, water is gradually evaporated and the temperature slowly rises to the melting point of the caustic (605° F.). As the heating continues, the caustic melts and last traces of water may be driven off. Heating may be continued until the temperature reaches 900° F. Typically the charge in the pot still is then drained into drums and solidified, or fed to a cooled flaking machine for solidification, or otherwise converted to merchantable solid form.

These time-consuming processes have been found to possess many disadvantages. Among these may be noted the short life of the pot stills in which the caustic is heated; the extremely high heat consumption due to the inefficient heat transfer between the heating flame and the iron pot still; the extended periods of time for evaporation of the water from the caustic and for removal of liquid or solidified anhydrous caustic from the pot still or containers; the high tendency of the product caustic, even in flake form, to cake; and the inconvenience of handling massive or caked caustic in processes where accurate control is required.

Various processes and types of apparatus have been proposed to eliminate the difficulties inherent in the hereinbefore described method of producing anhydrous caustic soda. Among the proposed processes may be noted those in which caustic solution is evaporated as a film or as a body of liquor under varying conditions of temperature and pressure. However none of these processes has been sufficiently satisfactory to warrant its adoption by the caustic industry. Film evaporation, although highly desirable because of its continuous nature and its efficiency, has been notably unsatisfactory. In prior attempts to use this technique, it has been difficult if not impossible to avoid warpage of the hot evaporating surfaces with consequent disruption of continuity of the film and localized overheating which in turn augments the wall warpage and film disruption.

It is an object of this invention to produce highly concentrated or anhydrous caustic from solutions thereof under conditions such that high purity product is readily obtained with minimum consumption of heat and without the attendant disadvantages characteristic of processes heretofore known to and employed by those skilled-in-the art. It is another object of this invention to permit attainment of high purity pelleted caustic. Other objects of this invention will be apparent to those skilled-in-the-art on inspection of the accompanying drawing and the following description.

In practice of this invention, caustic solution to be evaporated, preferably preheated, is divided into a plurality of thin, discrete, solid streams of at least $\frac{1}{32}''$ diameter. These streams are passed laterally and downwardly toward a substantially vertical, heated evaporating surface whereon they are intercepted at an angle of less than 45° to form thereon a continuous film of liquid. The film, as it flows downwardly, is evaporated to desired extent while liberating steam which passes upwardly. When the evaporation is conducted to produce anhydrous caustic, as is typically the case, the film of liquor is heated during its flow downwardly over the evaporating surface to temperatures suitable for producing molten anhydrous material which, when discharged from the film evaporator, may be solidified or otherwise treated for handling or shipment.

It is preferred, however, in the interests of ease of handling the dehydrated material in molten and subsequently solidified condition, that the material be pelleted. To this end, in practice of preferred aspects of the invention, the molten anhydrous material continuously discharged from the film evaporator is collected in a pool preferably heated, supported by a member or chamber bottom containing one or more orifices of size calibrated to discharge the molten material from the pool as discrete drops at rate substantially that of admission of molten caustic to the pool. Drops forming on the under side of the chamber bottom fall freely through space for a limited height onto a cooled moving surface such as a rotary platform, there to solidify substantially upon contact as pellets or granules of desired size and shape. In preferred operation of this aspect of the invention, described in more detail hereinafter, the pellets may be in the shape of oblate spheroids to buttons.

This invention, according to certain of its aspects, may be employed to evaporate charge solutions of caustic which may typically contain 45%–70%, say 50%, caustic by weight. Charge solution may preferably be heated to temperatures up to or approaching its boiling point (285° F. for e. g. 50% caustic soda) but typically to 80° F. to 340° F., say 335° F.

The charge solution, preferably preheated as noted, is then divided into a plurality of thin, separate, solid streams of predetermined diameter. Streams of solution which are too small in diameter, as determined by the size of the originating orifice, tend to break up or to mist when the velocity of the streams or of the upflowing exiting steam is too high, or when the trajectory of the stream is too extended. On the other hand, streams which are too large in diameter require too long a time for proper distribution over the evaporating surface and may result in formation of too thick a film on the surface. Under these conditions there is unequal heat loading of the wall surfaces, warping of the tube, and unequal evaporation from various portions of the liquid film. Streams of thickness or diameter, as determined by the diameter of the originating orifice or conduit, of at least about $\frac{1}{32}''$ are preferred. Although the diameter may be as large as $\frac{1}{8}''$, typically it will be less than $\frac{1}{16}''$.

It has been discovered as the result of prolonged experimentation and it is a necessary feature of this invention that delivery of charge caustic solution to the hot evaporating surface be in the form of thin, solid unbroken streams of liquor which intercept that surface at an angle of less than about 45° and preferably one which is at least 20°. If the angle of interception is greater than 45°, or if the streams or the surfaces thereof fray or break up into droplets or mist either by reason of their velocity or the velocity of the upwardly rising vapor from evaporation, a portion of the solution may either fail to reach the evaporation surface or, reaching it, fail to form thereon the desired thin film. In either event, a portion of the charge may drop substantially unchanged to the bottom of the evaporator and introduce water into otherwise concentrated or anhydrous molten product. If mist is formed, a portion of it may be carried out of the evaporator with the rising vapor to result in loss of product and in serious maintenance problems due to corrosion.

In preferred practice of the invention a distribution head provided with a number of orifices of desired diameter is disposed at sufficient distance from a heated evaporator wall to permit passage between the head and the wall at reasonably low velocity, typically less than 5 ft./sec., of the steam produced by the evaporation process. Liquor to be evaporated is projected horizontally, or substantially so, as solid streams at velocity sufficient to propel the same along a trajectory intercepting the evaporator wall at the desired angle. The particular velocity at which the streams are projected tends to increase somewhat with increase in distance between orifices and evaporator wall, which distance usually need be no more than a foot in which event suitable velocities are usually below about 1 ft./sec.

The distribution head may for example be a rotating basket or cup mounted on a vertical axis in the upper portion of a vertically extending evaporator tube. The lower portion of the basket may contain several rows of holes through which the liquor is projected as the basket rotates. Typically the basket may be of 2.5" to 8", say 3" in diameter and may rotate at 60 to 200 R. P. M., say 120 R. P. M. whereby the peripheral speed thereof may be 45 to 160, say 100 ft./min.

As the basket rotates, caustic solution continuously admitted thereto and contained therewithin is forced by centrifugal force through the perforations in the form of thin discrete streams. Each of these streams pursues a course outwardly (i. e. laterally) and downwardly from the basket toward the surrounding tube. Preferably the inside diameter of the tube 4" to 18", say 6" may be 1.6 to 2.25, say 2.0 times the outside diameter of the rotating basket. The area between the basket and the tube may be 60% to 80%, say 75% of the total tube area.

The thin, discrete, solid streams leaving the rotating basket will preferably meet the evaporator tube at the desired angle with the vertical of less than 45°, and typically within the range of 20°–45° and form a continuous thin film thereon with substantially no attendant shower or droplet formation. The continuous film, typically 0.03" to 0.125", say 0.0625" thick, formed around the inside of the upper or film-forming portion of the evaporator tube moves downwardly, typically at an initial downward velocity of 0.3 to 1.2, say 0.6 feet per second. The temperature of the tube at the point whereon the film is formed may be e. g. 400° F.–500° F. As this descending film moves downwardly, it passes through the heated section of the evaporator tube maintained, as by a surrounding furnace, at e. g. 665° F.–750° F., say 700° F. Heat from the tube evaporates water from the solution to form first concentrated solution and thence, if conditions of operations dictate, anhydrous molten caustic. Water liberated by evaporation from the downwardly descending aqueous solution passes upwardly as steam and provides a desired substantially air-free environment within the evaporation zone. Typically the environment will contain 95% steam or more, although it may be as low as 50%. Upon reaching the level at which the liquid is deposited on the heating surface, the liberated steam passes up between the thin discrete streams of liquid charge, and thence upwardly to be removed. Pressure within the evaporator tube may preferably be atmospheric pressure, although higher or lower pressure may be employed.

Although any desired concentration of the charge solution may be effected, it is preferred when treating caustic to remove as much water as possible and to produce as near anhydrous caustic as is possible. Typically water may be removed from the solution to yield anhydrous product containing less than 1.0% water and typically 0.1% to 1.5%.

Anhydrous molten caustic may be withdrawn at temperature of 600° F. to 750° F., say 700° F., from the lower extremity of the evaporator tube, into a dropping box wherein it may be maintained as a liquid reservoir at desired constant temperature of 600° F. to 690° F., say 650° F. by means of heaters. Preferably the depth of this reservoir may be 1" to 3", say 2.25" to provide sufficient head for proper pellet formation. Pelleting may be effected by passage from the liquid reservoir in the dropping box through a plurality of orifices or dropping conduits mounted on the lower portion of the dropping box. Typically the diameter of the orifice or conduit may be 0.02" to 0.04", say 0.035" and its length may be 0.25" to 1.0", say 0.75". Each dropping conduit may preferably terminate at the center of a regularly, preferably polygonal (e. g. hexagonal) or circular shaped horizontal flat dropping or contact surface. Width of this surface, typically 0.15" to 0.375", say 0.187", may control the size of the product pellet. Preferably the ratio between the area of the dropping plate and that of the orifice or conduit will be greater than 10, typically 25 to 115, say 28.8. Average weight of drops of caustic may be 125 mg. to 325 mg., say 135 mg.

Immediately under the orifices or dropping conduits, and typically spaced 0.25" to 0.50", say 0.375" therebelow, may be a cooled solidification plate which may be in the form of a belt, a rotary turntable, or a drum. The solidification plate may be at 50° F. to 175° F., say 75° F. at the point at which caustic is dropped thereon. The plate may be constructed to allow the pellets formed thereon to cool to 125° F. to 200° F., say 150° F. during a period of 0.5 to 1.5, say 1.0 minutes. Typically the plate may have an average linear velocity of 5 to 15, say 10 feet per minute.

In the accompanying drawing is shown a preferred form of apparatus by which the method of the present invention may be practiced, it being understood that the method is not intended to be limited to the details of the particular apparatus shown, but that the apparatus is set forth in a particular form which has been found readily capable of producing pure substantially anhydrous caustic from a charge aqueous solution.

According to the specific embodiment set forth in the drawing, 6" nickel evaporator tube 10, 13 feet long, was mounted in vertical position within a furnace generally designated 33. Tube 10 was surrounded by furnace tube 11 which was an 8" Inconel tube 12' 7" in length. Evaporator tube 10 projected approximately 5" above the upper extremity of furnace tube 11. Tube 11 was surrounded by inner protective layer 12 of 0.5" or greater thickness, of fiberglass tape and alundum cement. Each of the upper, middle, and lower portions of the inner protective coating 11 was wrapped with 60 feet of Nichrome ribbon 13 of 0.875" width and 0.020" thickness, the windings being spaced 0.875" apart. Each winding was connected to a 230 volt source of electric current.

An outer protective layer 14 was deployed over wire 13 to completely cover the same. Surrounding the assembly of tube 11, protective layers 12 and 14, and wire 13 was a 32" O. D. stainless steel tube or sheath 16 approximately 13 feet in length, containing pulverized Perlite insulation 15 which serves to retain the heat generated by the Nichrome ribbon. A cover plate 21, made of e. g. Transite, was employed to cover the body of insulation 15.

Suspended from the lower extremity of rotatable vertical shaft 18 was perforated, cylindrical, nickel distributor basket 17. This basket, 2" high and 3" in diameter was closed at the bottom. The periphery contained two rows of 0.03125" diameter holes 19 spaced 0.25" apart. The lower row of holes was 0.375" from the bottom of the basket and the upper row of holes was 0.25" above the lower row. In this embodiment, the lower row of holes was 3" above the point at which the evaporator tube 10 entered furnace tube 11. Hood 37, containing exhaust conduit 22 completely covered the upper extremity of tube 10. A conduit 20 permitted passage of liquid charge into basket 17.

The lower extremity of evaporator tube 10 was closed off by bottom plate 23. A thermocouple 26 penetrated plate 23 to measure temperature of liquid collected thereon. Discharge conduit 25 penetrated plate 23 and extended thereabove whereby a reservoir of liquid was maintained thereon. The lower end of conduit 25 led into dropping box 27.

Dropping box 27, formed of e. g. nickel, was a closed box 4.875" wide x 17" long x 2.25" high inside dimensions. Optionally a baffle may be placed in box 27 beneath tube 25 to evenly distribute liquid flowing therefrom over the entire area of the box. A jacket 34 was built along the sides of the box 27 and contained a plurality of heaters 28 imbedded in lead 35. The bottom of the box comprised dropping plate 29 containing, in this embodiment, 48 nipples arranged in four rows of 12 each on triangular 1.375" centers. The nipples projected 0.5" from a base thickness of 0.25". The lower extremity 31 of each nipple was hexagonal shaped and measured 0.1875" across at the tip. The flat, horizontal lower extremity or contact area 31 of each nipple was drilled in its center to form a liquid passage or orifice 30 of 0.035" diameter. A thermocouple 36 was provided in dropping box 27 to control the temperature of the liquid therein.

Immediately beneath the lower extremities of the nozzles of dropping plate 29 was solidification plate 32. In this embodiment, it included a moving belt of stainless steel 0.04" thick, 10' long, 32" wide. The belt was cooled by passage over a water cooled plate coil (not shown). This coil, extending 7' 5" along the belt, was placed 18.5" downstream from the point at which the caustic was deposited on the belt. The speed of movement of the belt could be regulated to be 5–15 feet per minute and its spacing from the contact areas of the dropping orifices could also be adjusted to regulate the dropping distance over a range of 0.25" to 0.50".

In operation of the process of this invention, according to this specific embodiment thereof as shown in the attached drawing, electric power was supplied to the Nichrome ribbon windings 13 of furnace 33 from a 230 volt, three phase A. C. source. The windings reached steady state temperature averaging 1690° F. after 4 hours. Under these conditions, temperature of the evaporator tube was 625° F.–700° F.

Charge liquid caustic solution had the following composition, the remainder being water:

| | | |
|---|---|---|
| NaOH | percent by weight | 50.0 |
| $Na_2CO_3$ | do | 0.03 |
| NaCl | do | 0.002 |
| $SiO_2$ | do | 0.0005 |
| $Fe_2O_3$ | do | 0.0002 |
| $Al_2O_3$ | do | 0.0002 |
| $CaCO_3$ | do | 0.0019 |
| $MgCO_3$ | do | 0.0002 |
| Cu (p. p. m.) | | 0.1 |
| Mn (p. p. m.) | | 0.2 |
| Ni (p. p. m.) | | 0.4 |

The above-noted charge 50% caustic solution was fed through conduit 6 and preheated in a heat exchanger 7 by steam at 185 p. s. i. g., fed through conduit 8 and withdrawn through conduit 9, from the charge temperature of 80° F. up to 335° F. Heated charge liquor, in amount of 159 pounds per hour, was passed through caustic feed pipe 20 to perforated basket 17. Speed of rotation of the basket was maintained at approximately 120 R. P. M. Charge liquid was ejected from basket 17 by centrifugal force in seventy-four thin, discrete, solid streams, each of which coursed outwardly (laterally) and downwardly toward the furnace tube 11. These streams were intercepted by the internal wall of this tube at an angle of approximately 45° and they formed thereon, at a level just above the point at which evaporator tube 10 enters furnace tube 11, a uniformly distributed falling film.

As this falling film passed downwardly over the wall of the evaporator tube 10, it entered the heating zone of furnace 33. Temperature of tube 10 at this point may be 450° F. The falling film was evaporated as it passed downwardly, and the water liberated therefrom as steam occupied the volume within the evaporator tube 10 and provided therein an inert, air-free atmosphere. The liquid collected on bottom plate 23, was substantially anhydrous caustic melt, the temperature of which was measured by thermocouple 26. Power input to Nichrome ribbon 13 and resultant temperature within the furnace were controlled in accordance with the reading from themocouple 26. Preferably control will be effected so that temperature of molten caustic in the pool at the bottom of evaporator tube 10, is less than 750° F. and preferably at about 700° F. for production of high purity anhydrous caustic soda.

Molten anhydrous caustic was withdrawn from the reservoir in the lower portion of the evaporator tube 10, through caustic discharge conduit 25 and passed into dropping box 27, wherein it was maintained as a pool. Temperature of the pool of molten caustic in box 27 may be regulated in accordance with the reading of thermocouple 36 by adjusting electric heaters 28 to obtain the preferred temperature.

Molten caustic at this preferred temperature was withdrawn from box 27 through conduits or orifices 30. A drop, formed on the contact area 31 may be retained thereon for 0.5 to 1.5 seconds. It is preferably passed through a distance of 0.25" to 0.50", say 0.375" onto the cooled solidification plate 32 which may be of stainless steel. The average pellet formed by passing liquid caustic at 700° F. through a 0.035" I. D. orifice 0.75" in length under a head of 2.25" of molten caustic in the box 27, and dropping through a distance of 0.375", weighed 135 mg. The pellet had a flat lower surface and a curved upper surface.

The temperature of plate 32 at the point of impact of the average drop was 80° F. and the drop was cooled by a water jacket under the plate, to a temperature of typically 150° F. or below in about 60 seconds. Cooling droplets remained on the plate for 120 seconds. Cooled product pellets did not adhere to the plate 32 and could be readily collected in suitable container. They were found to be free of undesirable discoloration and to contain carbonate impurity in amount less than 0.35%.

Typical analysis of product pellet caustic was as follows:

| | |
|---|---|
| Percent NaOH | 99.4 |
| Percent $Na_2CO_3$ | .34 |
| Percent Fe | .0004 |
| Percent Heavy Metals (as Ag) | .002 |
| Percent Cl | less than .003 |
| Percent $SO_4$ | less than .005 |
| Percent $H_2O$ (by diff.) | .25 |

While there have been described certain detailed aspects of this invention and specific embodiments by which it may be practiced, it will be apparent to those skilled-in-the-art that the invention is not limited specifically to these disclosed aspects, but that changes may be made therein which fall within the scope of the invention.

We claim:

1. A method of dehydrating an aqueous caustic solution which comprises dividing an aqueous caustic solution having a caustic concentration of at least 50% by weight into a plurality of thin, discrete, spaced, unbroken liquid streams within an upper portion of a vertically extending heated evaporator tube, each of said streams having a diameter of from about 1/32″ to 1/8″, passing said caustic streams outwardly and downwardly from the place of dividing toward an upper portion of an inner surface of said tube at a low velocity insufficient to cause aqueous caustic mist formation when said streams are intercepted by said inner surface, said streams having an initial horizontal velocity below 1 foot per second, the horizontal distance between the place of dividing and said tube inner surface being not in excess of about 1½ inches, intercepting each of said streams at said upper portion of the tube inner surface, the angle of interception between each stream and the vertical tube inner surface being from 20° to 45° whereby a thin continuous descending film of liquid aqueous caustic is formed on said inner surface without said mist formation, passing said film downwardly on said inner surface to contact a lower portion of said inner surface, said lower portion of the inner surface being heated to maintain it at a temperature above the melting point of anhydrous caustic to evaporate sufficient water as steam from said caustic film to obtain a final molten product having a caustic content of not less than 98.5%, passing said steam from its points of generation upwardly within said tube between said spaced, unbroken liquid streams at a low velocity insufficient to break the surfaces of said streams, said steam providing a substantially air-free environment adjacent said streams, withdrawing said steam from an upper end of said tube, and withdrawing said molten caustic product having a caustic content of not less than 98.5% from a lower end of said tube.

2. A method of dehydrating an aqueous solution of caustic soda to a water content of less than 1%, which comprises preheating an aqueous caustic soda solution having a caustic soda concentration of at least 50% by weight to a temperature below its boiling point, dividing the so-preheated solution into a plurality of thin, discrete, spaced, unbroken liquid streams each of diameter of from about 1/32″ to 1/16″, passing said causic streams outwardly and downwardly from the place of dividing toward an upper portion of an inner surface of said tube at a low velocity insufficient to cause aqueous caustic soda mist formation when said streams are intercepted by said inner surface, said streams having an initial horizontal velocity below 1 foot per second, the horizontal distance between the place of dividing and said tube inner surface being not in excess of about 1½ inches, said upper portion of the tube inner surface being maintained at a temperature of from 400° F. to 500° F., intercepting each of said streams at said upper portion of the tube inner surface, the angle of interception between each stream and the vertical tube inner surface being from 20° to 45° whereby a thin, uniform, continuous, descending film of liquid aqueous caustic soda is formed on said inner surface without said mist formation, passing said film downwardly on said inner surface to contact a lower portion of said inner surface maintained at a temperature of from 625° F. to 700° F. to evaporate substantially all water as steam from said caustic soda film, passing said steam from its points of generation upwardly within said tube between said spaced, unbroken liquid streams at a velocity less than 5 feet per second to avoid breaking the surfaces of said streams, said steam providing a substantially air-free environment adjacent said streams, withdrawing said steam from an upper end of said tube, and withdrawing molten caustic soda having a water content of less than 1% from a lower end of said tube.

References Cited in the file of this patent

UNITED STATES PATENTS

| | | |
|---|---|---|
| 198,057 | Tatham | Dec. 11, 1877 |
| 828,343 | Smith | Aug. 14, 1906 |
| 857,756 | Reddy | June 25, 1907 |
| 1,277,931 | Heuser | Sept. 3, 1918 |
| 1,637,377 | Heicke | Aug. 2, 1927 |
| 2,278,059 | Chambers et al. | Mar. 31, 1942 |
| 2,396,664 | Ladd | Mar. 19, 1946 |
| 2,562,495 | Hulme | July 31, 1951 |
| 2,590,905 | Tomlinson et al. | Apr. 1, 1952 |
| 2,643,180 | Miller | June 23, 1953 |
| 2,742,083 | Henszey | Apr. 17, 1956 |